(12) United States Patent
Wang et al.

(10) Patent No.: US 10,329,190 B2
(45) Date of Patent: Jun. 25, 2019

(54) HEAT TREATABLE COATED ARTICLE WITH ZIRCONIUM BASED LAYER(S) IN COATING

(71) Applicant: Guardian Glass, LLC, Auburn Hills, MI (US)

(72) Inventors: Jiangping Wang, Novi, MI (US); Jason Barber, Ypsilanti, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 0 days.

(21) Appl. No.: 15/293,601

(22) Filed: Oct. 14, 2016

(65) Prior Publication Data

US 2017/0029323 A1    Feb. 2, 2017

Related U.S. Application Data

(62) Division of application No. 13/760,239, filed on Feb. 6, 2013, now Pat. No. 9,751,800.

(51) Int. Cl.
| | |
|---|---|
| *C03C 17/245* | (2006.01) |
| *C03B 27/012* | (2006.01) |
| *C03C 17/23* | (2006.01) |
| *C03C 17/34* | (2006.01) |
| *C03C 17/22* | (2006.01) |

(52) U.S. Cl.
CPC .......... *C03C 17/245* (2013.01); *C03B 27/012* (2013.01); *C03C 17/225* (2013.01); *C03C 17/23* (2013.01); *C03C 17/3411* (2013.01); *C03C 2217/22* (2013.01); *C03C 2217/24* (2013.01); *C03C 2217/281* (2013.01); *C03C 2217/78* (2013.01); *C03C 2218/156* (2013.01)

(58) Field of Classification Search
CPC ............................................. C03C 2218/156
See application file for complete search history.

(56) References Cited

U.S. PATENT DOCUMENTS

| | | |
|---|---|---|
| 5,635,245 A | 6/1997 | Kimock et al. |
| 6,303,225 B1 | 10/2001 | Veerasamy |
| 6,303,226 B2 | 10/2001 | Veerasamy |
| 7,537,801 B2 | 5/2009 | Veerasamy et al. |
| 8,153,266 B2 | 4/2012 | Petrmichl et al. |
| 8,277,946 B2 | 10/2012 | Veerasamy |
| 8,318,312 B2 | 11/2012 | Petrmichl et al. |
| 9,751,800 B2 | 9/2017 | Wang et al. |
| 2005/0191494 A1 | 9/2005 | Veerasamy |
| 2006/0029813 A1 | 2/2006 | Kutilek et al. |
| 2006/0057294 A1 | 3/2006 | Veerasamy et al. |
| 2007/0254164 A1 | 11/2007 | Veerasamy et al. |

(Continued)

FOREIGN PATENT DOCUMENTS

| | | |
|---|---|---|
| WO | WO 02/48290 | 6/2002 |
| WO | WO 2005/021456 | 3/2005 |

OTHER PUBLICATIONS

U.S. Appl. No. 13/760,239, filed Feb. 6, 2013; Wang et al.

(Continued)

*Primary Examiner* — Robert S Walters, Jr.

(57) ABSTRACT

In certain example embodiments, a coated article includes a doped zirconium based layer before heat treatment (HT). The coated article is heat treated sufficiently to cause the doped zirconium oxide and/or nitride based layer to result in a doped zirconium oxide based layer that is scratch resistant and/or chemically durable. The doping of the layer has been found to improve scratch resistance.

7 Claims, 7 Drawing Sheets

(56) References Cited

U.S. PATENT DOCUMENTS

2011/0256408 A1   10/2011   Wang et al.
2012/0114878 A1    5/2012   Petrmichl et al.
2012/0164461 A1    6/2012   Petrmichl et al.

OTHER PUBLICATIONS

Pedzich "Tungsten Carbide as an Reinforcement in Structural Oxide-Matrix Composites" Chapter 4 in the book Tungsten Carbide—Processing and Applications edited by Liu, published Dec. 19, 2012.
Huafu et al., "Preparation and Characterization of Transparent Conducting ZnO:W Films by DC Magnetron Sputtering" Journal of Semiconductors vol. 32, No. 4, 2011, pp. 043002-1-043002-4.
U.S. Appl. No. 13/905,189, filed May 30, 2013; Wang et al.
"One-Step Synthesis and Characterization of $ZrO_2$—$WO_x$ Prepared by Hydrothermal Method at Autogenous Pressure"; Armendariz et al., Journal of Materials Chemistry, vol. 13, No. 1, Nov. 20, 2002; pp. 143-149.
U.S. Appl. No. 15/343,348, filed Nov. 4, 2016; Muller et al.

HEAT TREATABLE COATED ARTICLE WITH ZIRCONIUM BASED LAYER(S) IN COATING

This application is a division of application Ser. No. 13/760,239 filed Feb. 6, 2013, which is a continuation-in-part of application Ser. No. 13/905,189 filed May 30, 2013, the entire disclosures of which are all hereby incorporated herein by reference in this application.

This invention relates to a method of making a coated article to be used in a window unit or any other suitable application such as furniture glass, display case glass, picture frame glass, or the like. For example, certain embodiments of this invention relate to a method of making a coated article including a step of heat treating a glass substrate coated with at least a layer comprising zirconium (Zr) oxide and/or nitride doped with tungsten (W) and/or tungsten carbide. Following heat treatment, the coated article includes a glass substrate supporting at least a layer comprising zirconium oxide doped with tungsten.

Optionally, a layer of or including diamond-like carbon (DLC) may be provided over the tungsten-doped zirconium based layer prior to heat treatment (HT). DLC may be used to generate energy during HT, e.g., due to its combustion during HT, for transforming at least another layer in the coating so as to form a new post-HT layer(s) (e.g., tungsten-doped zirconium oxide based layer) which may not have been present in that form before the HT. Optionally, a dielectric barrier layer of or including silicon nitride, silicon oxide, or the like may be provided under the Zr-based layer so as to be located between at least the glass substrate and the Zr-based layer.

Certain other example embodiments of this invention relate to such a coated article, heat treated or not, which may be used in window applications, or any other suitable application such as furniture glass, display case glass, or the like.

BACKGROUND OF THE INVENTION

Windows are known in the art. For example, conventional IG window units include at least first and second glass substrates (one of which may have a solar control coating on an interior surface thereof) that are coupled to one another via at least one seal(s) or spacer(s). The resulting space or gap between the glass substrates may or may not be filled with gas and/or evacuated to a low pressure in different instances. However, many IG units are required to be tempered. Thermal tempering of the glass substrates for such IG units typically requires heating the glass substrates to temperature(s) of at least about 580 or 600 degrees C. for a sufficient period of time to enable thermal tempering.

Other types of coated articles also require heat treatment (HT) (e.g., tempering, heat bending, and/or heat strengthening) in certain applications. For example and without limitation, glass shower doors, glass table tops, and the like require HT in certain instances.

Diamond-like carbon (DLC) is sometimes known for its scratch resistant properties. For example, different types of DLC are discussed in the following U.S. Pat. Nos. 6,303,226, 6,303,225, and so forth, which are hereby incorporated herein by reference. It would sometimes be desirable to provide a window unit or other glass article with a protective coating including DLC in order to protect it from scratches and the like. Unfortunately, DLC tends to oxidize and burn off at temperatures of from approximately 350 degrees C. (possibly from 380 to 400 degrees C.) or higher, as the heat treatment is typically conducted in an atmosphere including oxygen. Thus, it will be appreciated that DLC alone as a protective overcoat cannot withstand heat treatments (HT) at the extremely high temperatures described above which are often required in the manufacture of vehicle windows, IG window units, glass table tops, tempered glass articles, and/or the like. Accordingly, DLC cannot be used alone as a coating to be heat treated, because it will oxidize during the heat treatment and substantially disappear as a result of the same (i.e., it will burn off).

Certain other types of scratch resistant materials also are not capable of withstanding heat treatment sufficient for tempering, heat strengthening and/or bending of an underlying glass substrate.

Accordingly, those skilled in the art will appreciate that a need in the art exists for a method of making a scratch resistant coated article that is capable of being heat treated (HT) so that after heat treatment the coated article is still scratch resistant. A need for corresponding coated articles, both heat treated and pre-HT, also exists.

U.S. Patent Document 2006/0057294 (hereby incorporated herein by reference), commonly owned with the instant application, discloses a coated article including a zirconium nitride based layer and optionally a layer comprising DLC. Heat treatment (e.g., thermal tempering) of the coated article causes the zirconium nitride based layer to transform into a scratch resistant zirconium oxide based layer. While heat treated coated articles of the '294 document are good and realize satisfactory results in many instances, there is room for improvement with respect to scratch resistance (SR).

BRIEF SUMMARY OF EXAMPLES OF INVENTION

In certain example embodiments of this invention, there is provided a method of making a coated article (e.g., furniture glass, shower door window, window such as for a vehicle or building, etc.) that is capable of being heat treated so that after being heat treated (HT) the coated article is scratch resistant to an extent more than uncoated glass.

In certain example embodiments of this invention, prior to heat treatment a coated article includes at least a layer(s) of or including tungsten-doped (e.g., tungsten doped and/or tungsten carbide doped) zirconium oxide and/or nitride on a glass substrate. This may be the only layer on the glass substrate in certain example embodiments, or alternatively other layers may be present. For instance, one or more layers of or including diamond-like carbon (DLC) may be present on the glass substrate over at least the tungsten-doped zirconium based layer. As another example, a dielectric barrier layer may be present between the glass substrate and the tungsten-doped zirconium based layer. Heat treatment (e.g., thermal tempering) of the coated article causes the tungsten-doped zirconium based layer to transform into a layer of or including tungsten-doped zirconium oxide that can be used for scratch resistant and/or corrosion resistant purposes.

Surprisingly, it has been found that the addition of tungsten (W) (e.g., doping with either pure tungsten or tungsten carbide) to the zirconium based layer remarkably improves the scratch resistance of the layer following heat treatment, compared to if the tungsten is not present. Unexpectedly, it has been found that the addition of the tungsten (W) to the zirconium based layer remarkably improves the scratch resistance of the layer, before and/or after heat treatment, compared to a pure ZrO coating on a glass substrate, and also compared to a pure WO coating on a glass substrate.

Furthermore, it has been unexpectedly found that the addition of the tungsten (W) to the zirconium based layer improves the corrosion resistance of the coated article, before and/or after heat treatment. Thus, a coated article with improved scratch resistance (SR) and improved corrosion resistance/chemical stability is provided.

In certain example instances, that are not limiting, the tungsten-doped zirconium oxide inclusive layer following heat treatment may be buffed or surface treated in order to improve scratch resistance thereof. Moreover, the zirconium inclusive layer may additionally be doped with other materials such as carbon in certain example non-limiting instances.

In certain example embodiments, an optional layer of or including diamond-like carbon (DLC) may be provided on the glass substrate over at least the W-doped zirconium inclusive layer prior to heat treatment, for purposes of protecting the W-doped zirconium inclusive layer prior to heat treatment (HT). In certain example embodiments, the DLC may be hydrogenated. The HT causes the layer comprising W-doped zirconium oxide and/or nitride to be transformed into a new post-HT layer comprising W-doped zirconium oxide, and optionally causes any optional DLC layer to burn off or combust. During HT, the optional DLC layer(s) will be oxidized and burn off, however, the new post-HT layer may contain some residual carbon. The new post-HT layer comprising W-doped zirconium oxide may also include nitrogen in certain example embodiments of this invention.

In certain example embodiments, at least prior to heat treatment, the layer(s) comprising W-doped zirconium oxide and/or nitride may also be doped with fluorine (F) and/or carbon (C).

The new post-HT layer comprising W-doped zirconium oxide is very scratch resistant. Thus, it can be seen that a technique has been provided which allows for a heat treatable scratch resistant product which is also corrosion resistant; and the coated article may also have good transmission properties.

In certain example embodiments of this invention, there is provided a method of making a heat treated coated article, the method comprising: having a coated article including a coating supported by a glass substrate, the coating comprising a tungsten-doped layer comprising an oxide and/or nitride of zirconium; and heat treating (e.g., thermally tempering) the coated article, including the glass substrate and the tungsten-doped layer comprising an oxide and/or nitride of zirconium, so that after the heat treating (e.g., tempering) a layer comprising tungsten-doped zirconium oxide is provided on (directly or indirectly) the glass substrate. There may be more tungsten than zirconium in at least one of: (i) the tungsten-doped layer comprising an oxide and/or nitride of zirconium, and (ii) the layer comprising tungsten-doped zirconium oxide.

In certain example embodiments of this invention, there is provided a coated article comprising: a glass substrate; and a layer comprising tungsten-doped zirconium oxide provided as an outermost layer of a coating provided on the glass substrate.

DETAILED DESCRIPTION OF EXAMPLE EMBODIMENTS OF THE INVENTION

Referring now more particularly to the accompanying drawings in which like reference numerals indicate like parts or layers throughout the several views.

Figure 1:
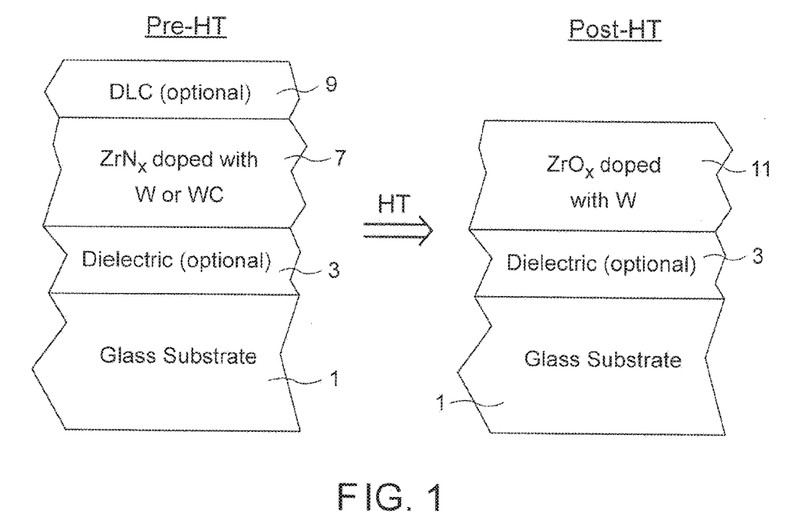
FIG. 1 is a schematic diagram illustrating cross-sections of coated articles according to an embodiment of this invention before and after heat treatment.
Figure 2:
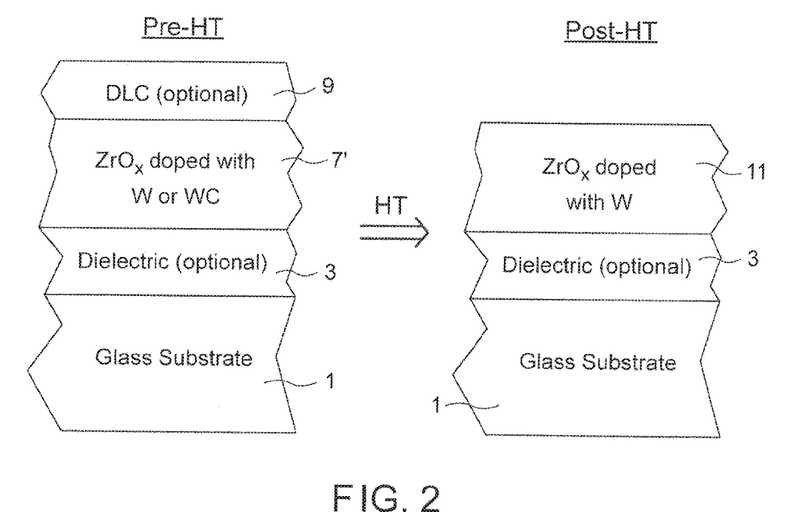
FIG. 2 is a schematic diagram illustrating cross-sections of coated articles according to an embodiment of this invention before and after heat treatment.
Figure 3:
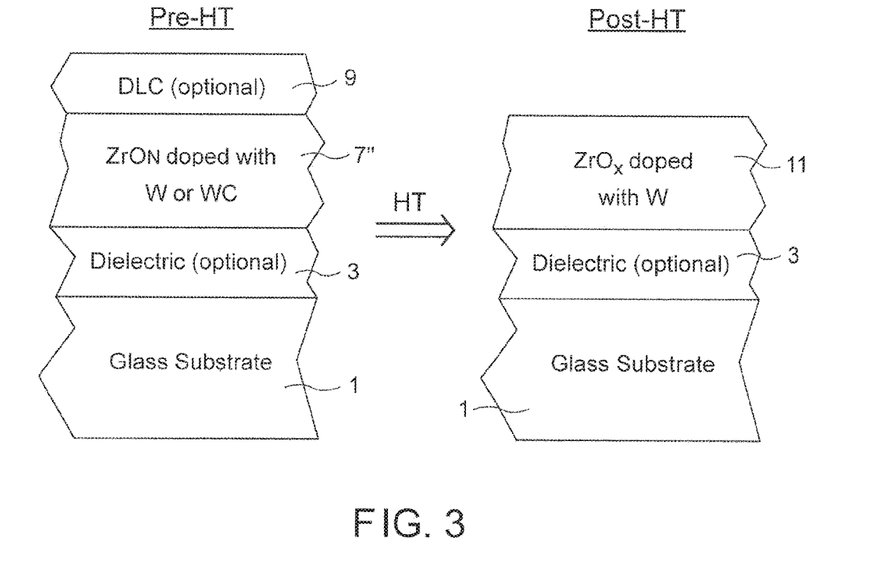
FIG. 3 is a schematic diagram illustrating cross-sections of coated articles according to an embodiment of this invention before and after heat treatment.

Referring to FIGS. 1-3, in certain example embodiments of this invention, prior to heat treatment a coated article includes at least one layer(s) 7, 7' 7" of or including tungsten-doped zirconium oxide and/or nitride on a glass substrate 1. Tungsten doping of the zirconium oxide, zirconium oxynitride, or zirconium nitride layer (7, 7' or 7') may be in the form of doping with tungsten (W), tungsten oxide, tungsten nitride, tungsten oxynitride, tungsten carbide (e.g, WC), tungsten oxycarbide, or the like in example embodiments of this invention. Thus, "tungsten-doped", "W-doped", and other similar phrases as used herein mean doped with at least tungsten and thus include at least doping with one or more of: tungsten, tungsten oxide, tungsten nitride, tungsten oxynitride, tungsten carbide (e.g, WC), and tungsten oxycarbide.

The tungsten-doped layer 7, 7', 7", 11 may be the only layer on the glass substrate 1 in certain example embodiments, or alternatively other layers may be present. For instance, one or more layers 9 of or including diamond-like carbon (DLC) may be present on the glass substrate over at least the tungsten-doped zirconium based layer prior to heat treatment in certain instances. As another example, a dielectric barrier layer(s) 3 may be present between the glass substrate 1 and the tungsten-doped zirconium based layer 7, 7' 7" before and/or after heat treatment. Heat treatment (e.g., thermal tempering) of the coated article causes the tungsten-doped zirconium based layer to transform into a layer of or including tungsten-doped zirconium oxide 11 that can be used for scratch resistant and/or corrosion resistant purposes. In certain example embodiments, the top layer 11 of the coating following heat treatment consists essentially of tungsten-doped zirconium oxide (e.g., $W:ZrO_x$) which is both scratch resistant (SR) and corrosion resistant. Other layer(s), in addition to the tungsten-doped zirconium based layer, may or may not be provided in different example embodiments of this invention.

Surprisingly, it has been found that the addition of the tungsten (W) to the zirconium based layer remarkably improves the scratch resistance of the layer, compared to if the tungsten is not present. Unexpectedly, it has been found that the addition of the tungsten to the zirconium based layer remarkably improves the scratch resistance of the layer, before and/or after heat treatment, compared to a pure zirconium oxide coating on a glass substrate, and also compared to a pure tungsten oxide coating on a glass substrate. Furthermore, it has been unexpectedly found that the addition of the tungsten (including tungsten carbide in certain example) to the zirconium based layer improves the corrosion resistance of the coated article, before and/or after heat treatment. Thus, a coated article with improved scratch resistance (SR) and improved corrosion resistance/chemical stability is provided. Accordingly, a transparent lubricious coating is provided for glass and ceramic substrates, comprising Zr, W and oxygen with scratch resistance better than that of pure zirconium oxide.

In certain example embodiments of this invention, the tungsten-doped zirconium based layer 7, 7', 7" may be of or include one or more of: W-doped $ZrO_x$, W-doped $ZrN_x$, W-doped $ZrO_xN_y$, or mixtures thereof, prior to heat treatment. The tungsten may or may not be oxided and/or nitrided in the layer 7, 7', 7" before HT, and may or may not be carbided in the layer 7, 7', 7" before HT. In certain embodiments, the heat treatment (HT) may involve heating a supporting glass substrate 1, with at least the W-doped zirconium based layer(s) 7, 7', 7" thereon, using temperature(s) of from 550 to 800 degrees C., more preferably from 580 to 800 degrees C. (which is well above the burn-off temperature of DLC). The high temperature developed during the HT heats the W-doped zirconium based layer(s) 7, 7', 7" and causes the layer to transform into W-doped zirconium oxide based layer 11 as a result of the HT. The tungsten may or may not be oxided in the W-doped layer 11 after HT. It is also noted that nitrogen, fluorine and/or carbon may optionally be present in the final post-HT layer 11 in certain example embodiments.

In certain example embodiments of this invention, the post-HT layer(s) 11 comprising W-doped zirconium oxide includes a nanocrystalline cubic lattice structure. The entire layer(s) 11 may be of a nanocrystalline cubic lattice structure type, or alternatively only part of the layer(s) 11 may include nanocrystalline cubic lattice structure post-HT. Prior to HT, the W-doped zirconium inclusive layer 7, 7', 7" need not have a nanocrystalline cubic lattice structure. Thus, it will be appreciated that the HT causes the W-doped zirconium based layer 7, 7', 7" to transform into a W-doped zirconium oxide based layer 11 having a nanocrystalline cubic lattice structure. In certain example embodiments, as a result of the HT, the amount of oxygen in the post-HT zirconium inclusive layer(s) 11 is higher than the amount of oxygen in the pre-HT zirconium inclusive layer(s) 7, 7', 7". Instead of a nanocrystalline cubic lattic structure, it is optional that post-HT layer(s) 11 comprising W-doped zirconium oxide may include a nanocrystalline tetragonal structure (e.g., cubic may be replaced with tetragonal in any embodiment herein).

In certain example embodiments of this invention, there is more Zr than W in the W-doped zirconium oxide based layers 7, 7', 7", 11. Thus, each such layer 7, 7', 7", 11 is said to be W-doped. In certain example embodiments of this invention, the W-doped zirconium based layer (e.g., $W:ZrO_x$, $W:ZrN_x$, $W:ZrO_xN_y$, $W:ZrB_x$, and/or $W:ZrC_x$) may contain less than 50% W (relative to the metal content of the layer which is/may be made up of W+Zr).

The metal content of layers 7, 7', 7", 11 may be from about 1-50% W in certain example embodiments of this invention, more preferably from about 2-40% W, even more preferably from about 2-30% W, even more preferably from about 5-30% W, and most preferably from about 10-20% W (atomic %). The remainder of the metal content of the layers 7, 7', 7" and 11 may be made up of Zr, although small amounts of other elements may be added. The metal content of layers 7, 7', 7", 11 may be from about 51-99% Zr in certain example embodiments of this invention, more preferably from about 52-97% Zr, even more preferably from about 70-95% Zr, even more preferably from about 80-90% Zr (atomic %). For purposes of example, with respect to metal content, a $W:ZrO_x$ layer containing 15% W has 85% Zr, and is also oxided as discussed herein (i.e., oxygen is not included in the metal content). In certain example embodiments of this invention, the Zr:W ratio in the W-doped zirconium based layer 7, 7', 7", 11 may be from about 50:1 to 1:1, more preferably from about 40:1 to 1.5:1, even more preferably from about 20:1 to 4:1, and still more preferably from about 10:1 to 5:1.

Moreover, in certain example embodiments of this invention, the W-doped zirconium based layers 7, 7' 7" and 11 may be from about 1 to 250 nm thick, more preferably from about 1 to 100 nm thick, and most preferably from about 5 to 50 nm thick in certain example embodiments of this invention, when high transmission is desired. An example thickness is about 300 angstroms (same as 30 nm). In certain example embodiments of this invention, before and/or after HT, coated articles herein have a visible transmission of at least about 50%, more preferably at least about 60%, and possibly at least about 70% or 75%.

In certain example embodiments, at least prior to heat treatment, one or more of the W-doped zirconium based layers 7, 7', 7", 11 may also be doped with fluorine (F), zinc (Zn), and/or carbon (C). This may be done, for example, by using a gas such as $C_2F_6$ during sputter-deposition of the W-doped zirconium based layer 7, 7', 7". Of course, following heat treatment the W-doped zirconium oxide based layer 11 may also be doped with F, Zn and/or C in a corresponding or substantially corresponding manner since it was present before HT. This doping with F, Zn and/or C may be used in conjunction with any embodiment discussed herein.

The W-doped zirconium based layer 7, 7', 7" may be deposited on the glass substrate (including optionally over a dielectric or other type of barrier layer(s) 3) by any suitable technique including but not limited to PVD and CVD. Sputter deposition is appropriate in certain example instances. The coating may be used in in-deposited form (i.e., no tempering or the like), but is typically heat treated at the high temperatures discussed herein (e.g., for tempering, heat bending and/or heat strengthening) to densify the W-doped zirconium based layer and reduce its absorption. The coating may be heat treated in a standard furnace used to temper glass in certain example instances. If, for example, the coated article is to be used in its as-deposited form, the W-doped zirconium based layer 7, 7', 7" may be deposited using a mixed tungsten and zirconium metal or ceramic sputtering target, or alternatively may be formed by merging single tungsten and zirconium sources (e.g., co-sputtering a W or WO target, and a Zr or ZrO target). If, for example, the coated article is to be used following HT, it can be made in a similar manner except that HT is used, or alternatively it can be made from discrete W and Zr containing layers and the mixed W:Zr oxide 11 following HT may be formed by diffusion which occurs during the HT. Optionally, a sacrificial layer 9 comprising carbon or DLC may be provided on the glass substrate over the W-doped zirconium based layer 7, 7', 7" for mechanical protection prior to HT (this carbon 9 inclusive layer typically burns off during HT).

FIG. 1 is a schematic diagram illustrating how a coated article can be made according to another example embodiment of this invention. Initially, a coated article is formed and includes a glass substrate 1. The coated article includes, supported by glass substrate 1, at least one optional dielectric barrier layer 3 of or including silicon nitride, silicon oxynitride, silicon oxide, or the like; at least one layer of or including W-doped zirconium nitride 7 (e.g., W:ZrN and/or any suitable stoichiometry where the W may or may not be nitrided and/or oxided), and an optional top layer of or including DLC 9.

Glass substrate 1 is typically of or includes soda-lime-silica glass, although other types of glass may be used in certain instances. Dielectric layer(s) 3 is provided in order to prevent or reduce sodium diffusion into the W-doped zirconium based layer 7 during HT (i.e., a diffusion barrier). Any of the aforesaid barrier layer 3 materials may be doped (e.g., 0.5 to 15%) with Al, stainless steel, or any other metal(s) in certain embodiments of this invention. Barrier layer(s) 3 is formed on the glass substrate 1 via sputtering, or via any other suitable technique. Dielectric barrier layer 3 may be from about 50 to 900 Å thick in certain example embodiments of this invention, more preferably from about 80-700 Å thick, and most preferably from about 100 to 400 Å thick (e.g., about 150 angstroms thick).

The layer 9 comprising DLC formed on the glass substrate 1 may be of any suitable type of DLC, including but not limited to any of the DLC types described in any of U.S. Pat. Nos. 6,592,993; 6,592,992; 6,531,182; 6,461,731; 6,447,891; 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; and/or 5,470,661, all of which are hereby incorporated herein by reference. For purposes of example only, DLC inclusive layer(s) 9 may be from about 5 to 1,000 angstroms (Å) thick in certain example embodiments of this invention, more preferably from 10-300 Å thick, and most preferably from 25 to 50 Å thick. In certain example embodiments of this invention, DLC layer(s) 9 may have an average hardness of at least about 10 GPa, more preferably at least about 20 GPa, and most preferably from about 20-90 GPa. Such hardness renders layer 9 resistant to scratching, certain solvents, and/or the like, before the sacrificial layer 9 burns off during HT. Layer 9 may, in certain example embodiments, be of or include a special type of DLC known as highly tetrahedral amorphous carbon (t-aC), and may be hydrogenated (t-aC:H) in certain embodiments. In certain hydrogenated embodiments, the t-aC:H type of DLC 9 may include from 4 to 39% hydrogen, more preferably from 5-30% H, and most preferably from 10-20% H. This t-aC or t-aC:H type of DLC for layer(s) 9 may include more $sp^3$ carbon-carbon (C—C) bonds than $sp^2$ carbon-carbon (C—C) bonds. In certain example embodiments, at least about 50% of the carbon-carbon bonds in DLC layer 9 may be $sp^3$ type carbon-carbon (C—C) bonds, more preferably at least about 60% of the carbon-carbon bonds in the layer(s) may be $sp^3$ carbon-carbon (C—C) bonds, and most preferably at least about 70% of the carbon-carbon bonds in the layer(s) may be $sp^3$ carbon-carbon (C—C) bonds. In certain example embodiments of this invention, the DLC in layer 9 may have an average density of at least about 2.4 gm/cm$^3$, more preferably at least about 2.7 gm/cm$^3$. Example linear ion beam sources that may be used to deposit DLC inclusive layer 9 on substrate 1 over the layers 3 and 7 include any of those in any of U.S. Pat. Nos. 6,261,693, 6,002,208, 6,335,086, or 6,303,225 (all incorporated herein by reference). When using an ion beam source to deposit layer 9, hydrocarbon feedstock gas(es) (e.g., $C_2H_2$), HMDSO, or any other suitable gas, may be used in the ion beam source in order to cause the source to emit an ion beam toward substrate 1 for forming layer 9. It is noted that the hardness and/or density of layer 9 may be adjusted by varying the ion energy of the depositing apparatus. In certain example embodiments, at least about 2,000 V (anode to cathode volts), e.g., about 3,000 V, may be used in the ion source in depositing layer 9. It is noted that the phrase "on the substrate" as used herein is not limited to being in direct contact with the substrate as other layer(s) may still be provided therebetween.

W-doped zirconium nitride inclusive layer 7 is provided on the glass substrate 1, and optionally between DLC layer 9 and dielectric barrier layer 3 in the FIG. 1 embodiment. In certain example embodiments, W-doped zirconium nitride inclusive layer 7 may be located directly between DLC layer 9 and barrier layer 3 so as to contact each of them; however in other example embodiments other layer(s) (not shown) may be provided therebetween. The W-doped zirconium nitride inclusive layer 7 may consist essentially of tungsten, zirconium and nitride, or alternatively may include other materials including but not limited to oxygen and/or dopants such as Al, F, C or the like. W-doped zirconium nitride inclusive layer 7 may be formed by sputtering or the like in certain example embodiments of this invention. In certain example embodiments of this invention, the W-doped zirconium nitride of layer 7 may possibly be represented by W doped $Zr_xN_y$, where the ratio x:y is from about 0.5 to 1.3, more preferably from about 0.8 to 1.2, and may be about 1.0 in certain example embodiments (the W may also be oxided and/or nitrided in the layer 7).

Once the pre-HT coated article shown on the left side of FIG. 1 is formed, it may or may not be subjected to heat treatment sufficient for at least one of heat bending, thermal tempering, and/or heat strengthening. Referring to FIG. 1, when subjected to HT (e.g., in a furnace using temperature(s) of from 550 to 800 degrees C., more preferably from 580 to 800 degrees C.), the upper or outer DLC inclusive layer 9 burns off due to combustion because of the high temperatures used during HT. The high temperature heats the layer 7 comprising W-doped zirconium nitride to a temperature(s) sufficient to cause the layer to densify and increase its visible transmission by decreasing its absorption. Because the layer comprising W-doped zirconium nitride 7 is heated to such a high temperature during HT, the layer 7 is transformed during the HT into a new post-HT layer comprising or consisting essentially of W-doped zirconium oxide 11. The new post-HT layer comprising W-doped zirconium oxide 11 may also include nitrogen (and/or other dopants) in certain example embodiments of this invention. The new post-HT layer comprising W-doped zirconium oxide 11 (optionally with nitrogen) is surprisingly scratch resistant thereby providing a heat treated scratch resistant coated article. It is noted that the phrase "zirconium oxide" as used herein includes $ZrO_2$ and/or any other stoichiometry where Zr is at least partially oxided. The post-HT layer comprising W-doped zirconium oxide 11 may include from 0-30% nitrogen in certain example embodiments of this invention, more preferably from 0-20% nitrogen, even more preferably from 0-10% nitrogen, and possibly from about 1-5% nitrogen in certain example embodiments of this invention (atomic %). In certain example embodiments of this invention, the post-HT layer comprising W-doped zirconium oxide 11 includes a nanocrystalline cubic lattice or tetragonal structure (although the pre-HT layer comprising W-doped zirconium nitride need not in certain instances). In certain example embodiments of this invention, the heat treated layer 11 comprising W-doped zirconium oxide includes W:$Zr_xO_y$, wherein y/x is from about 1.2 to 2.5, more preferably from about 1.4 to 2.1. As explained above, it has been found that the addition of the tungsten (W) to the zirconium based layer 7, 7', 7", 11 remarkably improves the scratch resistance of the layer following heat treatment, compared to if the W is not present.

The final HT (or even the non-HT) coated article of FIG. 1 is scratch resistant and may be used in various applications, including but not limited to IG window units, furniture glass, shower door windows, laminated vehicle windshields, other types of vehicle windows, display glass, and/or the like.

FIG. 2 illustrates another example embodiment according to this invention. The FIG. 2 embodiment is the same as the FIG. 1 embodiment described above, except that pre-HT W-doped zirconium nitride layer 7 of the FIG. 1 embodiment has been replaced with a W-doped zirconium oxide layer 7' in the FIG. 2 embodiment. The thicknesses, Zr contents, W contents, ratios, etc. discussed above with respect to layer 7 also apply to layer 7' in the FIG. 2 embodiment. In other words, the FIG. 2 embodiment is the same as the FIG. 1 embodiment except that the nitrogen in layer 7 has been replaced (or supplemented) with oxygen. Regarding the layer 7' of or including W-doped $ZrO_x$ in FIG. 2, "x" may be from about 1 to 2 in certain example embodiments of this invention, more preferably from about 1 to 1.9. The zirconium oxide based layer 7' in the FIG. 2 embodiment, which is W-doped as discussed herein, may or may not also include nitrogen. The post-HT layer 11 in the FIG. 2 embodiment is essentially the same as that described above with respect to the FIG. 1 embodiment. This is because the HT causes both W-doped $ZrO_x$ (see 7' in FIG. 2) and W-doped $ZrN_x$ (see 7 in FIG. 1) to transform into a more dense and less absorbing W-doped $ZrO_x$ top layer 11 as shown in FIGS. 1-2.

FIG. 3 illustrates another example embodiment according to this invention. The FIG. 3 embodiment is the same as the FIG. 1 embodiment described above, except that pre-HT W-doped zirconium nitride layer 7 of the FIG. 1 embodiment has been replaced with a W-doped zirconium oxynitride layer 7" in the FIG. 2 embodiment. The thicknesses, Zr contents, W contents, ratios, etc. discussed above also apply to layer 7" in the FIG. 3 embodiment. In other words, the FIG. 3 embodiment is the same as the FIG. 1-2 embodiments except that the layer 7" is of or includes W-doped zirconium oxynitride, where the W may or may not be oxided and/or nitrided. The post-HT layer 11 in the FIG. 3 embodiment is essentially the same as that described above with respect to the FIG. 1-2 embodiments. This is because the HT causes both W-doped $ZrO_x$ (see 7' in FIG. 2), W-doped $ZrN_x$ (see 7 in FIG. 1) and W-doped Zr oxynitride (see 7" in FIG. 3) to transform into a more dense and less absorbing layer 11 of or including W-doped $ZrO_x$ as shown in FIGS. 1-2. Of course, layer 11 may contain small amounts of other materials such as nitrogen, fluorine and/or carbon.

In any of the example embodiments discussed above, one or more of the layers comprising zirconium and tungsten (e.g., see layers 7, 7', 7" and/or 11) may be doped with fluorine (F) and/or carbon (C). This may be done, for example, by using a gas such as $C_2F_6$ during sputter-deposition of the layer(s) comprising zirconium. For instance, a layer of W:ZrN:F may be formed by sputtering a Zr/W target(s) (or a Zr target together with a W target) in an atmosphere including a mixture of $N_2$ and $C_2F_6$ gases (Ar gas may also be used in certain example instances in addition to $N_2$ and $C_2F_6$ gases), and oxygen gas may also be present. When $C_2F_6$ gas is used in the sputtering atmosphere, the resulting layer 7, 7', 7" comprising W-doped zirconium oxide, nitride, and/or oxynitride is typically doped with both F and C since both are present in the gas. Other gases could instead be used. Of course, following heat treatment the layer comprising W-doped zirconium oxide 11 may also be doped with F and/or C in a corresponding or similar manner since it was present before HT. This doping of W-doped zirconium oxide and/or nitride with F and/or C may be used in conjunction with any embodiment discussed herein. In certain example embodiments of this invention, one or more of layers 7, 7', 7" and/or 11 may be doped with from about 0.01 to 10.0% F, more preferably from about 0.1 to 8.0% F, even more preferably from about 0.3 to 5.0% F, still more preferably from about 0.4 to 2% F, and most preferably from about 0.5 to 1.0% F (in terms of atomic percent). Moreover, in certain example embodiments of this invention, one or more of these layers may be doped with from about 0.01 to 10.0% C, more preferably from about 0.1 to 8.0% C, even more preferably from about 0.3 to 5.0% C, still more preferably from about 0.4 to 2% C, and most preferably from about 0.5 to 1.0% C (in terms of atomic percent). The doping with F and C may be used together so that one or more of these layers is/are doped with both F and C in these amounts. Alternatively, only one of the dopants F and C may be used for a layer. Thus, in such alternative embodiments, one or more of these layers 7, 7', 7" and 11 may be doped with F in the aforesaid amount(s), but not doped with C. As yet another alternative, one or more of these layers may be doped with C in the aforesaid amount(s), but not doped with F.

In certain example embodiments of this invention, good scratch resistance can also be realized by doping the zirconium based layer (e.g., one or more of 7, 7', 7" and/or 11) with a mixture of W/Cu. This may, for example, be done in forming the zirconium inclusive layer (7, 7', 7") prior to HT, with the doping material makings its way into the post-HT layer 11 as well. Thus, in certain example embodiments, the W-doped zirconium oxide based layer 11 may also include amounts of Cu. In certain example instances, in addition to the W doping material discussed herein, the amount of Cu in the layer (7, 7', 7" and/or 11) may be from about 0-10%, more preferably from about 0-8%, even more preferably from about 0.5-8%, possibly from about 1-5%.

Any suitable type of glass substrate 1 may be used in different embodiments of this invention. For example, various types of soda lime silica glass or borosilicate glass may be used for substrate 1. Optionally, the substrate 1 could alternatively be of another ceramic such as quartz.

In certain example embodiments of this invention, the layers 3 and 7 are sputter-deposited on substrate 1. And layer 9 may be ion-beam deposited on the substrate 1, over the layers 3 and 7.

Layers 7, 7, 7" may be sputter-deposited on (directly or indirectly) substrate 1 in any suitable manner. In certain example embodiments, in order to "hide" the tungsten (or tungsten oxide/nitride/carbide) in the zirconium oxide and/or nitride based layer 7, 7', 7", the tungsten and zirconium may be co-sputtered (or sputtered from a mixed, single target, in different instances) in a controlled way according to certain example embodiments. As used herein, "co-sputtered" may refer to substantially simultaneous sputtering from at least two targets, or sequential sputtering from at least two targets. The sputtering target(s) discussed below in the example embodiments can be planar target(s), rotating cylindrical magnetron target(s), or a combination thereof. Metal or ceramic targets may be used.

Figure 4:
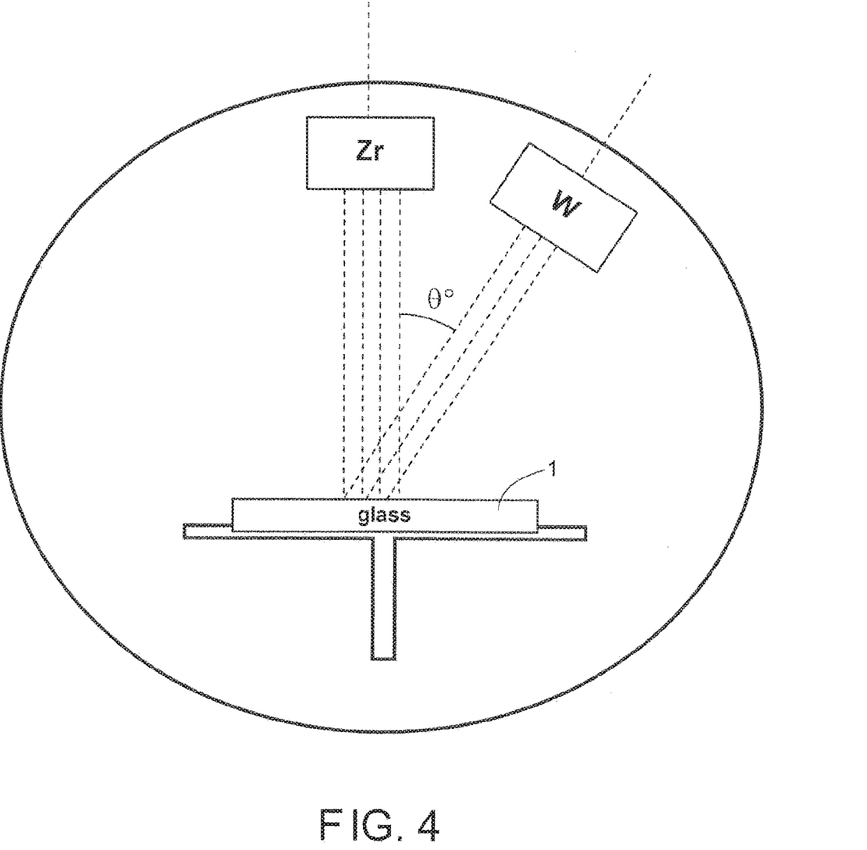
FIG. 4 shows a process of making a coated article on the left side of any of FIGS. 1-3, including sputtering tungsten (or tungsten carbide) in a direction angled relative to a sputtering direction of zirconium according to an example embodiment of this invention.

In a first example embodiment shown in FIG. 4, for sputter-depositing layer 7, 7' and/or 7'', the W is sputtered from a tungsten target (which may also include carbon and/or oxygen) and the Zr is sputtered from a zirconium target (which may also include oxygen) so that the respective sputtering directions are angled from each other. More specifically, the Zr sputtering direction is substantially perpendicular to the substrate 1, and the W sputtering direction is offset by an angle of theta (θ), as shown in FIG. 4. This position assists informing a layer 7, 7' and/or 7'' with tungsten, tungsten carbide, tungsten oxide, and/or tungsten nitride "hidden" in a zirconium oxide and/or nitride matrix, and helps maintain the stability of the crystalline formation in the coating after optional heat-treatment. The angle theta (θ), as shown in FIG. 4, is from about 0 to about 60 degrees, more preferably from about 10 to about 50 degrees, and most preferably from about 30 to about 45 degrees.

Figure 5:
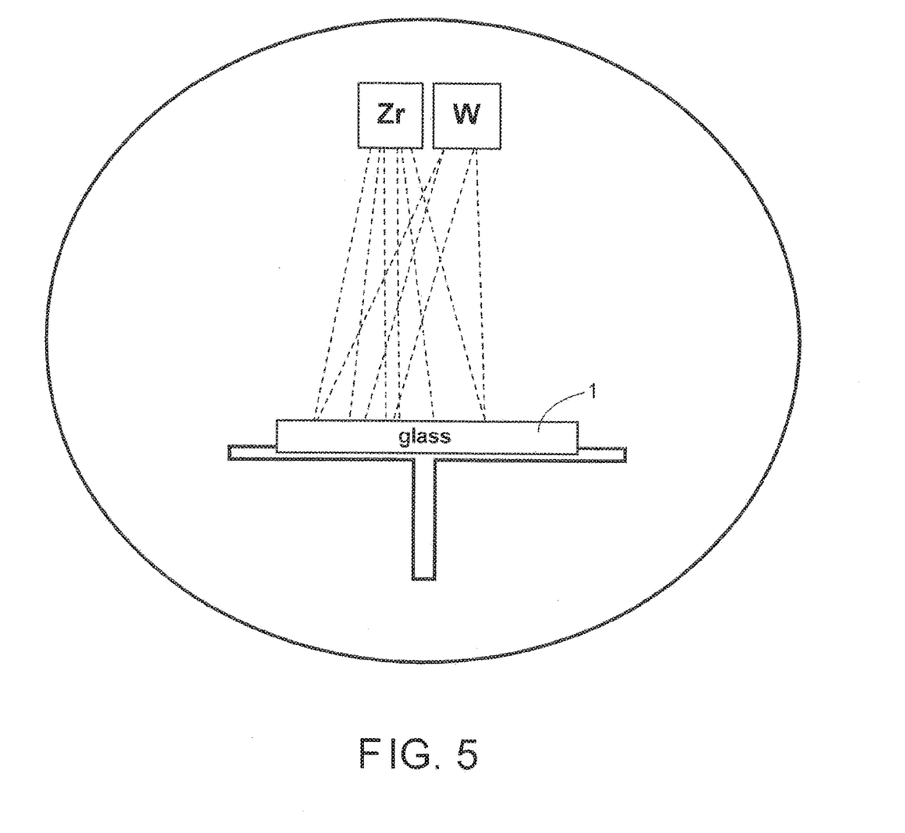
FIG. 5 shows a process of making a coated article on the left side of any of FIGS. 1-3, including power-controlled co-sputtering from both zinc (or zinc aluminum) and tungsten (or tungsten carbide) targets according to an example embodiment of this invention.

Referring to FIG. 5, in another example embodiment, the layer 7, 7', and/or 7'' may be sputter-deposited via power controlled co-sputtering of W and Zr inclusive targets. In this embodiment, the Zr and W based targets may or may not be substantially parallel, and are sputtered using different powers to control the composition and crystallinity of the layer 7, 7' and/or 7'' in a desirable manner.

It is noted that the W target in FIG. 4 and/or FIG. 5 may be a target of or including tungsten carbide in certain example embodiments, so that the tungsten-doped layer 7, 7', 7'' is doped with tungsten carbide, and is thus also doped with carbon. In such embodiments, the layer 11 post-HT also includes tungsten carbide and thus is also doped with carbide.

Figure 6:
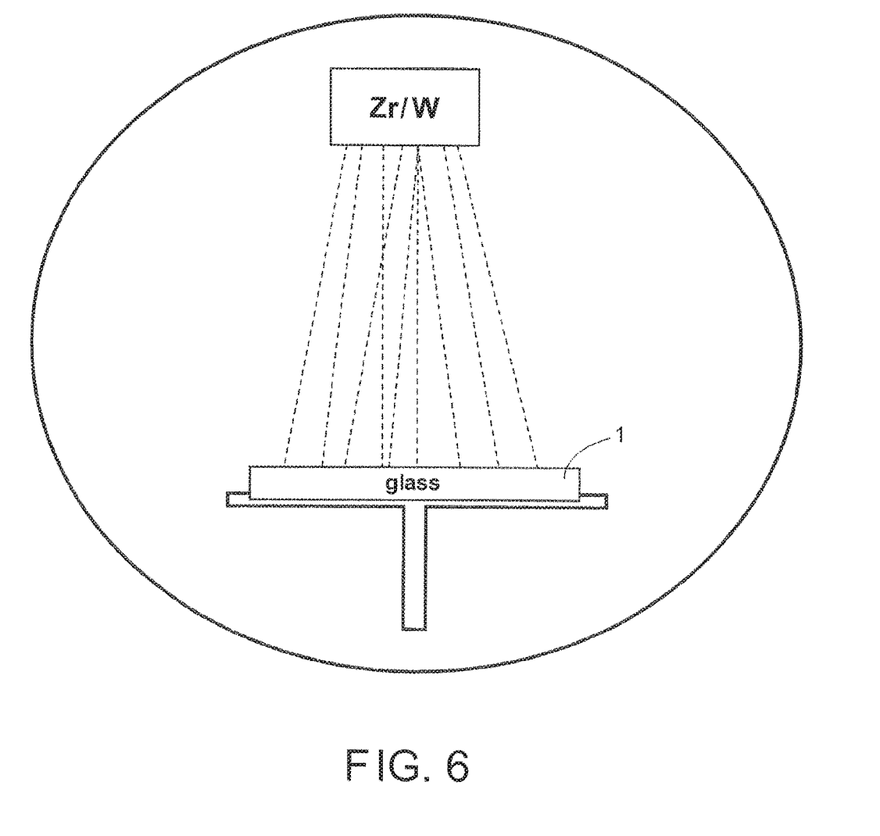
FIG. 6 shows a process of making a coated article on the left side of any of FIGS. 1-3, including sputtering at least tungsten and zirconium from a patched target including both Zr and W according to an example embodiment of this invention.

Referring to FIG. 6, in another example embodiment, at least one target is used in depositing layer 7, 7' and/or 7'' and that target may include both zirconium and tungsten (and possibly oxides of each) in a certain ratio which operates to help control the composition and crystallinity of the layer being sputter deposited. For example, the target may contain a patched pattern of zirconium and tungsten to ensure that each respective element is deposited in the desired amount, and is in substantially crystalline form (or in a formation that is conducive to becoming crystalline upon heat treatment). The target may also comprise any pattern that would create the appropriate ratio and structure when sputtered.

Figure 7:
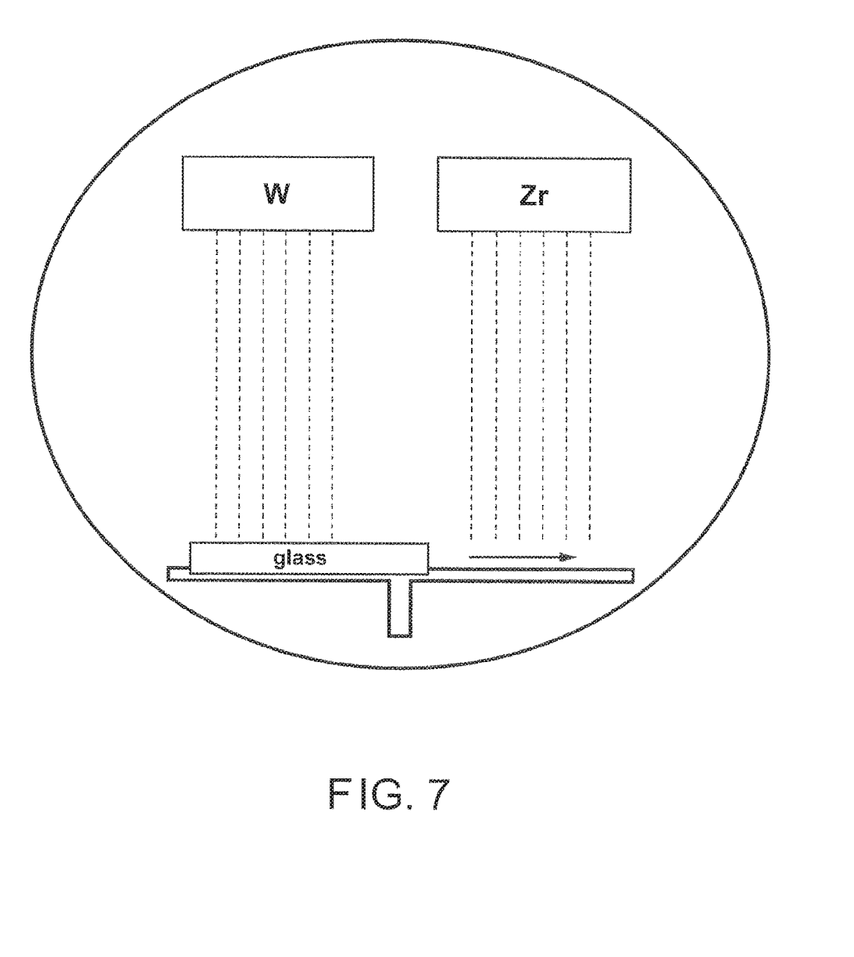
FIG. 7 shows a process of making a coated article on the left side of FIG. 8, including sputter-depositing layers from at least tungsten and zirconium targets, according to an example embodiment of this invention.
Figure 8:
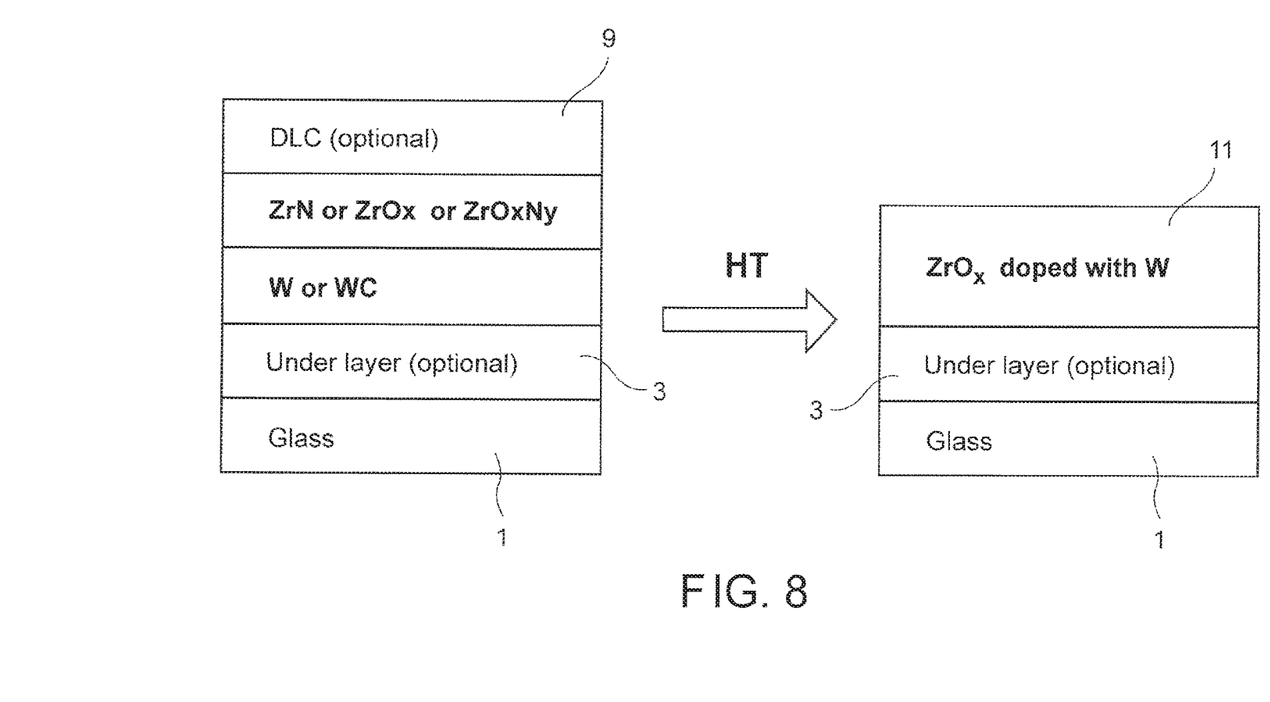
FIG. 8 is a schematic diagram illustrating cross-sections of coated articles according to an embodiment of this invention before and after heat treatment.

FIGS. 7-8 illustrate another example embodiment of this invention, which includes sequential sputtering from separate W and Zr targets (e.g., see FIG. 7). The sputtering technique used in FIG. 7 results in a coated article as shown at the left side of FIG. 8. In this embodiment, thin, alternating layers of or including zirconium (or zirconium oxide, or zirconium nitride, or zirconium oxynitride) and tungsten (or tungsten carbide) are formed on the substrate 1 as shown at the left side of FIG. 8. In this embodiment, the discrete layers are formed prior to HT such as thermal tempering. During HT (e.g., thermal tempering), there can be migration or diffusion between the W-based and Zr-based layers. Following HT for example, a layer 11 comprising W-doped zirconium oxide 11 may result as shown at the right side of FIG. 8, as described above with respect to any of the other embodiments herein.

Again, in any of the above embodiments, metal or ceramic targets can be used. The targets may be planar targets or rotating cylindrical magnetron sputtering targets, or a combination thereof.

The deposition method of W-doped zirconium oxide and/or nitride is not limited to the above embodiments. Any deposition method may be used that results in the appropriate structure and composition of the W-doped zirconium oxide and/or nitride based layer.

In example embodiments of this invention, there is provided a method of making a heat treated coated article, the method comprising: having a coated article including a coating supported by a glass substrate, the coating comprising a tungsten-doped layer comprising an oxide and/or nitride of zirconium; and heat treating (e.g., thermally tempering) the coated article, including the glass substrate and the tungsten-doped layer comprising an oxide and/or nitride of zirconium, so that after the heat treating (e.g., tempering) a layer comprising tungsten-doped zirconium oxide is provided on (directly or indirectly) the glass substrate.

In the method of the immediately preceding paragraph, there may be more zirconium than tungsten in at least one of: (i) the tungsten-doped layer comprising an oxide and/or nitride of zirconium, and (ii) the layer comprising tungsten-doped zirconium oxide.

In the method of any of the preceding two paragraphs, a metal content of the layer comprising tungsten-doped zirconium oxide may be from about 2-40% tungsten, more preferably from about 5-30% tungsten.

In the method of any of the preceding three paragraphs, a metal content of the layer comprising tungsten-doped zirconium oxide may be from about 51-99% zirconium, more preferably from about 70-95% zirconium.

In the method of any of the preceding four paragraphs, the layer comprising tungsten-doped zirconium oxide may include W-doped $Zr_xO_y$, where y/x is from about 1.2 to 2.5, more preferably from about 1.4 to 2.1.

In the method of any of the preceding five paragraphs, the layer comprising tungsten-doped zirconium oxide may further comprise fluorine and/or carbon.

In the method of any of the preceding six paragraphs, the layer comprising tungsten-doped zirconium oxide may consist essentially of tungsten-doped zirconium oxide.

In the method of any of the preceding seven paragraphs, prior to heat treating (e.g., tempering), the tungsten-doped layer comprising an oxide and/or nitride of zirconium may be of or include tungsten-doped zirconium oxide, tungsten-doped zirconium oxynitride, and/or tungsten-doped zirconium nitride.

In the method of any of the preceding eight paragraphs, prior to heat treating (e.g., tempering), the coating may further comprise a layer comprising diamond-like carbon located on the glass substrate over at least the tungsten-doped layer comprising an oxide and/or nitride of zirconium.

In the method of any of the preceding nine paragraphs, prior to and/or after heat treating, the coating may further comprise a dielectric layer between the glass substrate and the tungsten-doped layer.

In the method of any of the preceding ten paragraphs, the layer comprising tungsten-doped zirconium oxide may have a nanocrystalline cubic lattice structure.

In the method of any of the preceding eleven paragraphs, the layer comprising tungsten-doped zirconium oxide may be an outermost layer of the coating following heat treating (e.g., tempering).

In the method of any of the preceding twelve paragraphs, the heat treated (e.g., tempered) coated article may have a visible transmission of at least 50%, more preferably at least 60%.

In example embodiments of this invention, there is provided a coated article comprising: a glass substrate; and a layer comprising tungsten-doped zirconium oxide provided as an outermost layer of a coating provided on the glass substrate.

In the coated article of the immediately preceding paragraph, the coating may consist or consist essentially of only of the layer comprising tungsten-doped zirconium oxide, or alternatively may have a dielectric layer such as silicon nitride, silicon oxide, or silicon oxynitride provided between the glass substrate and the tungsten-doped layer.

In the coated article of any of the preceding two paragraphs, the glass substrate may be thermally tempered.

In the coated article of any of the preceding three paragraphs, the layer comprising tungsten-doped zirconium oxide may further comprise Cu, F and/or C.

In the coated article of any of the preceding four paragraphs, the layer comprising tungsten-doped zirconium oxide may comprise a nanocrystalline cubic lattice structure.

In the coated article of any of the preceding five paragraphs, the coated article may have a visible transmission of at least about 50%, more preferably of at least about 60%.

In the coated article of any of the preceding six paragraphs, there may be more zirconium than tungsten in the layer comprising tungsten-doped zirconium oxide.

In the coated article of any of the preceding seven paragraphs, a metal content of the layer comprising tungsten-doped zirconium oxide may be from about 5-30% tungsten.

In the coated article of any of the preceding eight paragraphs, a metal content of the layer comprising tungsten-doped zirconium oxide may be from about 70-95% zirconium.

In the coated article of any of the preceding nine paragraphs, the layer comprising tungsten-doped zirconium oxide may comprise tungsten carbide.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of making a heat treated coated article, the method comprising:
   sputter-depositing a tungsten oxycarbide doped layer comprising an oxide and/or nitride of zirconium on a glass substrate;
   wherein said sputter-depositing of the tungsten oxycarbide doped layer comprising an oxide and/or nitride of zirconium includes sputtering a target comprising zirconium in the presence of at least a carbon inclusive gas;
   thermally tempering the glass substrate with the tungsten oxycarbide doped layer comprising an oxide and/or nitride of zirconium sputtered thereon, so that after the tempering a layer comprising tungsten oxycarbide doped zirconium oxide is provided on the glass substrate.

2. The method of claim 1, wherein the carbon inclusive gas comprises $C_2F_6$.

3. The method of claim 1, further comprising sputter depositing a layer comprising silicon nitride on the glass substrate so as to be located between the glass substrate and the tungsten oxycarbide doped layer comprising an oxide and/or nitride of zirconium.

4. A method of making a coated article, the method comprising:
   sputter-depositing a tungsten oxycarbide doped layer comprising a nitride of zirconium on a glass substrate;
   wherein said sputter-depositing of the tungsten oxycarbide doped layer comprising the nitride of zirconium includes sputtering a target comprising zirconium;
   thermally tempering the glass substrate with the tungsten oxycarbide doped layer comprising the nitride of zirconium sputtered thereon so that after said tempering a layer comprising tungsten oxycarbide doped zirconium oxide is provided on the glass substrate.

5. The method of claim 4, further comprising sputter depositing a layer comprising silicon nitride on the glass substrate so as to be located between the glass substrate and the tungsten oxycarbide doped layer comprising the nitride of zirconium.

6. A method of making a heat treated coated article, the method comprising:
   having a coated article comprising a tungsten oxycarbide doped layer comprising an oxide and/or nitride of zirconium on a glass substrate;
   heat treating the coated article, including the glass substrate and the tungsten oxycarbide doped layer comprising an oxide and/or nitride of zirconium on the glass substrate, so that after the heat treating a layer comprising tungsten oxycarbide doped zirconium oxide is provided on the heat treated glass substrate.

7. The method of claim 6, wherein said heat treating comprises thermal tempering the glass substrate.

* * * * *